US012755232B2

(12) United States Patent
Dohrn

(10) Patent No.: US 12,755,232 B2
(45) Date of Patent: Oct. 6, 2026

(54) APPARATUS AND METHODS FOR TRANSPORT OPTIMIZATION

(71) Applicant: Hammel Companies Inc., Pittsburgh, PA (US)

(72) Inventor: Joseph Charles Dohrn, Woodland Park, CO (US)

(73) Assignee: Hammel Companies Inc., Pittsburgh, PA (US)

( * ) Notice: Subject to any disclaimer, the term of this patent is extended or adjusted under 35 U.S.C. 154(b) by 0 days.

(21) Appl. No.: 17/976,102

(22) Filed: Oct. 28, 2022

(65) Prior Publication Data

US 2024/0144153 A1 May 2, 2024

(51) Int. Cl.

*G06Q 30/018* (2023.01)
*G06N 20/00* (2019.01)
*G06Q 10/047* (2023.01)
*G06Q 10/08* (2023.01)
*G06Q 10/087* (2023.01)
*G06Q 10/10* (2023.01)
*G06Q 30/02* (2023.01)
*G06Q 30/06* (2023.01)

(52) U.S. Cl.

CPC ............ *G06Q 10/08* (2013.01); *G06N 20/00* (2019.01); *G06Q 10/047* (2013.01); *G06Q 30/018* (2013.01)

(58) Field of Classification Search

CPC .... G06Q 50/28; G06Q 10/047; G06Q 30/018; G06N 20/00
USPC .................................................. 705/1.1, 317
See application file for complete search history.

(56) References Cited

U.S. PATENT DOCUMENTS 6,429,810 B1 * 8/2002 De Roche ............... G01S 19/34 342/357.75
6,681,179 B1 1/2004 Chen
7,497,201 B2 * 3/2009 Hollenbeck ......... F02D 41/2422 123/436
8,019,634 B2 * 9/2011 Wegner ............ G06Q 10/06316 705/7.22
8,554,474 B2 10/2013 Kruithof
9,677,886 B2 6/2017 Didjusto
10,740,716 B1 * 8/2020 Souliotis ................ G06Q 50/40
11,035,718 B2 * 6/2021 Gonçalves ............. G01G 19/08
11,823,212 B2 * 11/2023 Russo .................. G06Q 30/018
2002/0059075 A1 * 5/2002 Schick ................... G06Q 10/06 705/305
2007/0225878 A1 * 9/2007 Kumar ................ B61L 15/0058 701/19
2009/0186325 A1 * 7/2009 Kumar ..................... G09B 9/06 434/219
2012/0158299 A1 * 6/2012 Cerecke ............. G01C 21/3469 701/533

(Continued)

FOREIGN PATENT DOCUMENTS

WO WO-2014178055 A1 * 11/2014 ........... G06Q 10/047

*Primary Examiner* — Jonathan P Ouellette
(74) *Attorney, Agent, or Firm* — Caldwell LLC

(57) ABSTRACT

An apparatus and methods for transport optimization are provided. Transport optimization may include optimizing of one or more pathways of a transport. Transport data related to a transport may be received and compared to one or more transport plan parameters to determine a pathway deviation. Pathway deviation may include instructions for altering transport plan of the transport for an updated transport plan.

20 Claims, 6 Drawing Sheets

(56) References Cited

U.S. PATENT DOCUMENTS

| | | | | |
|---|---|---|---|---|
| 2016/0196527 | A1* | 7/2016 | Bose | G06Q 10/0832 705/332 |
| 2016/0368495 | A1* | 12/2016 | Luther | B61L 15/0058 |
| 2018/0218318 | A1* | 8/2018 | Passila | G06Q 10/0832 |
| 2019/0164126 | A1* | 5/2019 | Chopra | G06Q 10/0834 |
| 2021/0024100 | A1* | 1/2021 | Calleija | G08G 1/202 |
| 2021/0140777 | A1* | 5/2021 | Balva | G01C 21/3484 |
| 2021/0362564 | A1* | 11/2021 | Polyzois | B60H 1/00971 |
| 2022/0156083 | A1* | 5/2022 | Neumann | G06F 9/3853 |
| 2022/0176965 | A1* | 6/2022 | Gesang | B60W 10/06 |
| 2022/0268593 | A1* | 8/2022 | Cabrero Barros | H04L 67/12 |
| 2022/0355644 | A1* | 11/2022 | Gopavaram | B60P 3/20 |
| 2023/0092093 | A1* | 3/2023 | Reczek | G06K 7/10366 |
| 2023/0230023 | A1* | 7/2023 | Khaleghi | G06Q 10/0833 705/7.25 |

* cited by examiner

APPARATUS AND METHODS FOR TRANSPORT OPTIMIZATION

FIELD OF THE INVENTION

The present invention generally relates to the field of transportation management. In particular, the present invention is directed to an apparatus and methods for transport optimization.

BACKGROUND

Modern providers have many transports that need to be tracked and the providers need to determine environmental impacts of transports accordingly. Current systems for tracking transports are not time efficient and are prone to human error.

SUMMARY OF THE DISCLOSURE

In an aspect, an apparatus for transport optimization is disclosed. The apparatus includes at least a processor and a memory communicatively connected to the at least a processor. The memory includes instructions configuring the at least a processor to receive transport data related to a transport, compare transport data to one or more transport plan parameters of a current transport plan of the transport, determine a pathway deviation as a function of the transport data and the transport plan parameters, wherein the pathway deviation comprises instructions for an updated transport plan of the transport.

In another aspect, a method for transport optimization is disclosed. The method includes receiving, by a processor, transport data related to a first transport. The method includes receiving, by a processor, transport data related to a first transport, comparing, by the processor, the transport data to one or more transport plan parameters of a transport plan of the transport, and generating, by the processor, a pathway deviation as a function of the transport data and the one or more transport plan parameters, wherein the pathway deviation comprises instructions for an updated transport plan of the transport.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Described in this disclosure is an apparatus for optimization of a transport. A transport may include a shipment, where one or more objects may be moved from one location to another using a transport vehicle. A transport may include transport factors and/or attributes, which define a current plan of the transport. Apparatus and methods described in this disclosure may be used to determine an optimized plan by comparing transport data, which describes the factors of the current transport plan, to one or more set parameters. For instance, and without limitation, transport data may be compared to desired set parameters provided by, for example, a user or a computing device. A pathway deviation may be determined by comparing the transport data to the set parameters. Optimized factors may be generated that optimize transport plan, allowing for an ideal transport pathway for a shipment of goods.

In the following description, for the purposes of explanation, numerous specific details are set forth in order to provide a thorough understanding of the present invention. It will be apparent, however, that the present invention may be practiced without these specific details. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
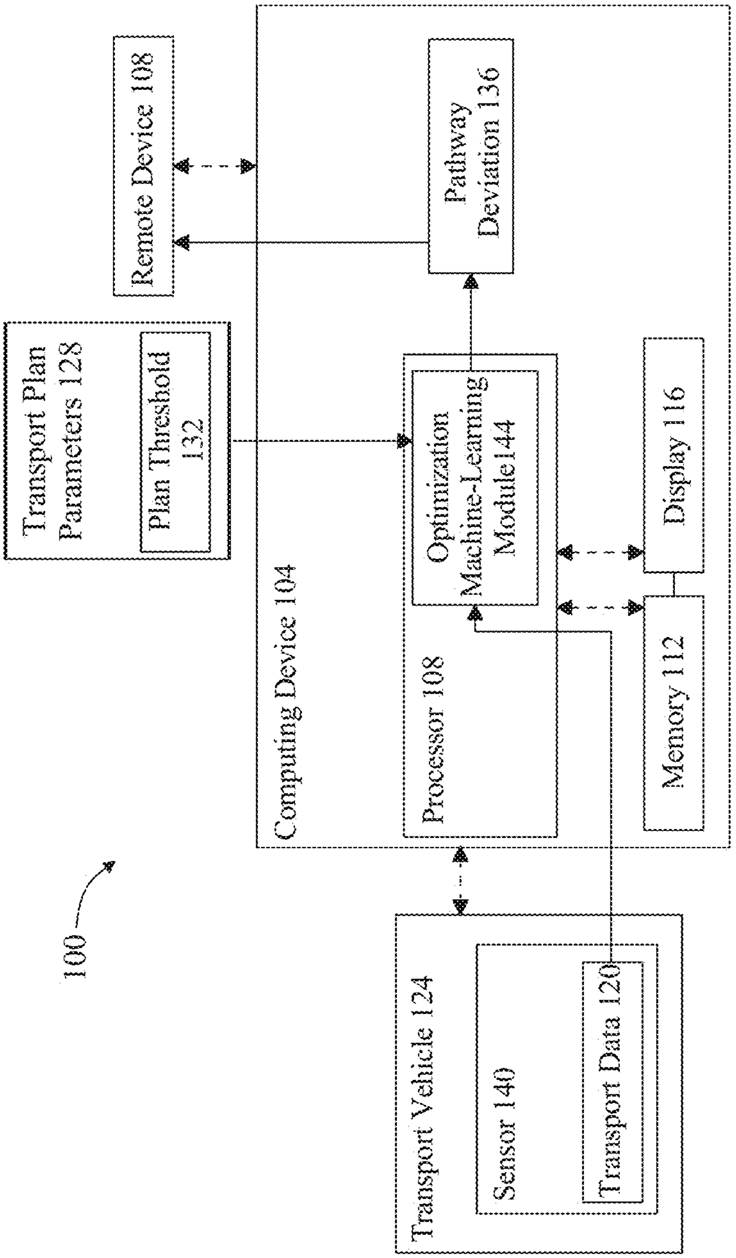
FIG. 1 is a block diagram of an apparatus for transport optimization in accordance with one or more embodiments of the present disclosure.

Referring now to FIG. 1, an exemplary embodiment of an apparatus 100 for optimizing a transport is illustrated. Apparatus 100 may include at least a processor 108 and a memory 112, which is communicatively connected to processor 108. Memory 112 may include instructions configuring processor 108 to perform various tasks, such as the processes, steps, or methods described in this disclosure. As used in this disclosure, “communicatively connected” means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

In one or more embodiments, apparatus 100 includes a computing device 104. In one or more embodiments, and without limitation, computing device 104 may include processor 108 and memory 112. Computing device 104 may include any computing device as described in this disclosure, including, and without limitation, a microcontroller, microprocessor, processor, computing system, digital signal processor (DSP), control chip, and/or system on a chip (SoC) as described in this disclosure. Computing device 104 may include, be included in, and/or communicate with a mobile and/or remote device such as a mobile telephone, smartphone, tablet, laptop, and the like. Computing device 104 may be integrated into a transport vehicle 124, such as disposed in or attached to a dashboard of a vehicle. In other embodiments, computing device 104 may be remote to vehicle 108. In one or more embodiments, computing device 104 may include a single computing device operating independently, or may include two or more computing devices operating in concert, in parallel, sequentially, or the like. Two or more computing devices may be included together in a single computing device or in two or more computing devices. Computing device 104 may interface or communicate with one or more additional devices as described below in further detail via a network interface device. For example, and without limitation, computing device 104 may be communicatively connected to one or more remote devices. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104, and/or components thereof, may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In one or more embodiments, computing device 104 may include components, such as processor 108, memory 112, a communication component, a display 116, or other components. In one or more embodiments, computing device 104 may also include one or more sensors, which may be communicatively connected to processor 108, memory 112, or other individual components of computing device 104. In other embodiments, computing device 104 may be communicatively connected to a remote sensor, as discussed further in this disclosure. In one or more embodiments, each component may be communicatively connected to one or more of the other components of computing device 104 and/or a remote device, such as remote device 108 (e.g., remote user device). For example, and without limitation, memory 112 may be communicatively connected to processor 108. In one or more embodiments, memory 112 of computing device 104 contains instructions configuring processor 108 to execute any of the steps, processes, and/or methods described in this disclosure.

Still referring to FIG. 1, memory 112 contains instructions configuring processor 108 to receive transport data 120. For the purposes of this disclosure, "transport data" is information related to transport factors of a transport. A "transport factor" for the purposes of this disclosure, includes an attribute of a transport. For example, and without limitation, a transport factor may include an origin, destination, arrival time, departure time, estimated transport durations, transport paths, path conditions, transport components, types of transports, traffic conditions, and the like. For the purposes of this disclosure, a "traffic condition" is a status of a transport path based on movement of vehicles traversing along the transport path. Transport data may be received from a carrier device, such as a smartphone, tablet, laptop, desktop, any other computing device, and the like. For the purposes of this disclosure, a "transport" is a movement of one or more objects from a first location to a second location via a transport vehicle. In one or more embodiments, a transport may include a transport plan. In some embodiments, a transport plan may include a current transport plan. For the purposes of this disclosure, a "current transport plan" is a one or more actions or stages for completing a transport. In nonlimiting embodiments, a transport may occur to move a product from a manufacture to a vendor. A transport may include a shipment of moveable goods. For the purposes of this disclosure, a "transport vehicle" is a machine or mobile structure capable of moving one or more objects between one or more locations. In one or more embodiments, a vehicle, such as transport vehicle 124 (also referred to in this disclosure as a "vehicle"), facilitates the movement of goods during transport. In some embodiments, transport vehicle 124 may include, but is not limited to, a freight carrier, a truck, a car, a boat, a plane, a helicopter, a tractor, a car, a ship, a motorcycle, bicycle, and the like. Transport vehicle 124 may be configured to operate through, but is not limited to, air, land, or sea. In some embodiments, a plurality of vehicles may be used during a single transport. Transport vehicle 124 may be configured to engage in one or more steps or stages of a transport. For example, and without limitation, transport vehicle 124 may engage in pickup, delivery, and/or line haul operations. In some embodiments, transport vehicle 124 may include, but is not limited to, Less than Truckload ("LTL") and/or Full Truckload ("FTL") freight delivery. In various embodiments, transport vehicle 124 may be controlled and/or operated by an operator. An "operator," for the purposes of this disclosure, is a person that uses or controls a transport vehicle. Transport vehicle 124 may be used to move objects from one location to another. Objects may include, as nonlimiting examples, cargo, goods, livestock, non-fungible goods, fungible goods, produce, cargo containers, oil, liquids, gasoline, food, meals, people, products, and the like.

Still referring to FIG. 1, transport data 120 may include information related to a transport duration of transport. "Transport duration", for the purposes of this disclosure, is temporal factor associated one or more portions of a transport. In one or more embodiments, transport duration may include the amount of time required for a transport to be completed over a particular distance by vehicle 124. Transport duration may be a portion of a total transport, such as, for example, transport duration may include a time for vehicle 124 to travel from an initial location to a checkpoint of transport. In other embodiments, transport duration may include the time taken by vehicle to travel from an initial location to a final location (e.g., destination). Transport duration may be measured in units such as seconds, minutes, hours, days, and the like.

Still referring to FIG. 1, transport data 120 may include information related to a transport distance of transport. For the purpose of this disclosure, a "transport distance" is a positional factor of quantitative value associated with a change in a position of a vehicle or objects during a transport. For instance, and without limitation, transport distance may include the displacement of objects by one or more vehicles during a transport. Transport distance may be measured in units such as, for example, inches, feet, yards, miles, meters, kilometers, and the like. In some embodiments, the transport distance may include distance data. For the purposes of this disclosure, "distance data" is information concerning the amount of distance traversed during a transport or a task of a transport. As nonlimiting examples, distance data may be 50 miles, 10 miles, 5 miles, and the like. Distance data may be expressed in any suitable distance unit, including but not limited to miles, kilometers, feet, yards, furlongs, leagues, and the like. Distance data may be measured over a period of time. The period of time may be, as a nonlimiting example, the duration of an entire transport or a portion of a transport. As another nonlimiting example, the period of time may be the last 3 days, 1 week, 3 months, 2 years, and the like. As another nonlimiting example, the period of time may be the period of time it took to complete a particular task of the transport. As a nonlimiting example, if a task took 5 hours to complete, the period of time may correspond to those 5 hours.

Still referring to FIG. 1, transport data 120 includes information related to a transport route of transport. For the purposes of this disclosure, a "transport route" is a path along which a vehicle moves, or travels, during the transport of objects. For instance, and without limitation, a transport route may include a path along a surface that vehicle 124 traverses along. In an example, and without limitation, a transport route may include a path defined by compass directions, such as cardinal directions, that a vehicle follows along. In another example, and without limitation, transport route may include a road or improved surface that extends along a terrain, such as the surface of the earth. In one or more embodiments, transport route may include a path on land, in water, or in air. In one or more embodiments, transport route may include geographic data, which may include a surface gradient, surface material, humidity, fundamental properties (e.g., height, period, or direction of a wave), and the like. For example, and without limitation, geographic data may include a gradient of a surface that vehicle 124 will travel along, such as a road. Geographic data may also include a route surface type or condition, such as asphalt, dirt, ice, wet, snow-covered, and the like. In one or more embodiments of the present disclosure, geographic data may include data that can be mapped to a sphere (e.g., a spherical representation of Earth). Geographic data may be indicated using longitude and latitude related to the location of an object on Earth. In various embodiments, geographic data may include GPS data. In one or more embodiments, geographic data may include geometric data, where geometric data may be mapped on a two-dimensional (2D) surface. In one or more embodiments, geographic data may include topography of a surface, such as the surface of the Earth. For example, and without limitation, geographic data may include a gradient of a hill, an altitude of a location, a change in altitude of a road, a curvature of a road, and the like. In one or more embodiments, geographic data may include an environmental condition. For example, and without limitation, environmental conditions may include ambient temperature, weather (e.g., snow, rain, sleet, sunshine, humidity, and the like), road conditions (e.g., black ice on a road, paving of a road, and the like), and the like.

Still referring to FIG. 1, transport data 120 may include information related to vehicle data of a transport. For the purposes of this disclosure, "vehicle data" is data related to a transport vehicle utilized during a transport. In one or more embodiments, vehicle data may include a make, model, current mileage, smog ratings, weight, dimensions, engine type, and the like. In some embodiments, vehicle data may pertain to the transport vehicle that was used to accomplish a relevant task of a transport. Vehicle data may include a type of vehicle, such as, as non-limiting examples, a truck, a car, a tractor, a motorcycle, a bike, and the like. In some embodiments, vehicle datum may include a make of vehicle, such as VOLVO, MACK, PETERBILT, FORD, BMW, YAMAHA, and the like. In some embodiments, vehicle datum may include a model of vehicle, such as LR, TERRAPRO, F150, PRIUS, IMPALA, and the like. In one or more embodiments, vehicle data 320 may include a weight of the vehicle and/or components thereof (e.g., an attached trailer), a capacity of the vehicle, a make and model of the vehicle, an engine or motor characteristics of the vehicle (e.g., torque, horsepower, size, and the like), and the like. In some embodiments, vehicle data may include a mile per gallon rating for a vehicle such as, 24 mpg, 30 mpg, 17, mpg, and the like.

In one or more embodiments, vehicle data may include fuel usage data. For the purposes of this disclosure, "fuel usage data", or "fuel consumption data", is data pertaining to amounts of fuel consumed over a period of time by a vehicle such as, for example, a transportation vehicle. In one or more embodiments, fuel usage data may include the type of fuel used an/or consumed during the period of time. Fuel may include, but is not limited to, gasoline, diesel, propane, electricity, liquefied natural gas, and/or other fuel types. In some embodiments, a transport vehicle may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, bio-fuel, vegetable oil, propane, and the like. In the instance of alternative fuel, an energy conversion factor may be included. In some embodiments, an energy conversion factor may include, but is not limited to, gallons to electric equivalent for a hybrid or electric transport vehicle. Greenhouse gas data may be consistent with any greenhouse gas data disclosed in U.S. patent application Ser. No. 17/749,535, filed on May 20, 2022, and entitled "SYSTEM AND METHOD FOR GREENHOUSE GAS TRACKING," the entirety of which is incorporated by reference herein in its entirety. The period of time may be, as a nonlimiting example, the duration of a shipment and/or a at least a portion of the shipment (e.g., over a specific distance of a shipment distance). As another nonlimiting example, the period of time may be the period of time it took to complete a particular task (e.g., reach a specific checkpoint or complete an entire shipment). As a non-limiting example, if a task took 5 hours to complete, the period of time may correspond to those 5 hours. A "task," for the purposes of this disclosure is an item of work of a shipment element. In some embodiments, the task may be a task that is to be done or has been done by an operator. In some embodiments, the task may be a job for an operator, which includes moving one or more objects from one location to another. In some embodiments, the task may be a job for an operator, which includes moving one or more objects from one location to another using a transport vehicle. In some embodiments, the task may be a job for an operator to do using a transport vehicle. In some embodiments, data may include fuel, idling time, traffic data, and the like. A person of ordinary skill in the art would appreciate, after having reviewed the entirety of this disclosure, that a variety of data could be used in addition to or in place of the data mentioned here in order to calculate carbon emission metrics.

Still referring to FIG. 1, transport data 120 may include information related to cargo data of transport. For the purposes of this disclosure, "cargo data" is information describing objects moved during a transport. In one or more embodiments, cargo data may include information related to one or more objects desired by a customer, such as a vendor, to be transported by a transport vehicle from an origin location. Cargo data may include dimensions, weight, quantity, packaging, loading/unloading, and the like. For instance, and without limitation, cargo data may include information related to a quantity of a good, which may be measured in weight (e.g., 200 lbs), a spatial measurement (e.g., 6 $ft^3$), or a numerical value (e.g., 150 count of a particular product). In another instance, and without limitation, cargo data may include characteristic information, such as fragility, shape, surface area, packaging, expiration date, perishable status, temperature requirement, and the like. In one or more embodiments, cargo data may include activity during shipment loading or unloading, and, thus, carbon emission metric may be provided by emission machine-learning model as a function of transport data related to information related to the unloading or loading of objects onto or off of, receptively, vehicle 124. An emission machine learning model may be trained on training data correlating transport factors to greenhouse gas generation. An emission machine learning model may be configured to input transport factors and output estimated greenhouse gas emissions. In some embodiments, computing device 104 may be configured to estimate greenhouse gas emissions of particular users, transports, individual contributing factors, and the like. Shipment loading or unloading may contribute to carbon emissions due to efficiency. For example, and without limitation, transport vehicle 124 may idle for an extended period of time during the loading/unloading of an extensive quantity of goods onto vehicle 124 during transport. In some embodiments, vehicle 124 idling for extended periods of time during loading or unloading may be caused by a lack of efficiency of shipment loading or unloading. Inefficiencies in shipment loading or unloading may cause other transport vehicles to spend more time idling as those other transport vehicles await to load or unload objects related to other transports, causing even more carbon emissions. In one or more embodiments, cargo data may include packaging of objects being moved by vehicle 124 during transport. For instance, and without limitation, transport data 120 may include time or resources spent packaging a product prior to shipment or waste created to package the product. In an embodiment, packaging of the transport object may affect carbon emissions and thus carbon impact of the transport. Single use products may contribute more to carbon emissions as compared to eco-friendly or reusable packaging such as paper, or the like. In another instance, and without limitation, packaging of objects for transport may include space efficiency. For example, and without limitation, poor packaging may result in less objects per shipment by vehicle 124, thus, resulting in an increase in vehicles used for a particular transport. Therefore, packing efficiency may contribute to carbon emissions, as the more efficient the packaging, the more products may be loaded onto vehicle 124 during the transport, such as a first transport of vehicle 124.

Still referring to FIG. 1, in some embodiments, user input may include transport data 120 of transport. In some embodiments, apparatus 100 may receive transport data 120 from one or more external computing devices, such as without limitation servers, desktops, smartphones, and the like. A "transport" as used in this disclosure is a movement of one or more objects between two or more locations. Transport may include, without limitation, transport vehicles, transport components, and the like. "Transport vehicles" as used in this disclosure are devices configured to provide locomotive capabilities. Transport vehicles may include, without limitation, cars, trucks, motorcycles, boats, planes, drones, bicycles, and the like. "Transport components" as used in this disclosure are objects that are moved between two or more locations. Transport components may include, without limitation, construction materials, electronics, perishables, food, consumer goods, clothes, industrial equipment, parcels, freight shipments, and the like. "Transport data" as used in this disclosure is information pertaining to one or more transports. Transport data 120 may include, without limitation, origins, destinations, geographical data, estimated delivery times, estimated costs, and the like. Geographical data may include, without limitation, GPS coordinates, altitude, longitude, latitude, and the like. In some embodiments, geographical data may include relative location data. "Relative location data" as used in this disclosure is information pertaining to a particular geographical point. Relative location data may include, for instance and without limitation, distances between two or more geographical points, closest points of interest, and the like.

Still referring to FIG. 1, in various embodiments, transport data 120 may be transmitted by one or more sensors, such as sensor 140, to processor 108 of computing device 104. Processor 108 may be communicatively connected to sensor 140. Memory 112 may be communicatively connected to sensor 140 so that transport data 120 generated and transmitted by sensor 140 may be stored in memory 112. Sensor 140 may include one or more sensors. For example, and without limitation, sensor 140 may include a sensor array, where sensor array may include a plurality of the same type of sensors or of different types of sensors. In one or more embodiments, sensor 140 may be remote to computing device 104. In other embodiments, sensor 140 may be integrated into computing device 104. In one or more embodiments, sensor 140 may be attached to vehicle 124. For instance, and without limitation, sensor 140 may be attached to an engine, exhaust, wheel, wing, motor, power source, fuselage, body, windshield, cargo bay, trailer, hull, propulsion system, undercarriage, frame, and the like. In one or more embodiments, and without limitation, sensor 140 may be configured to detect an environmental phenomenon and generated transport data as a function of the detected phenomenon. For instance, and without limitation, sensor 140 may be configured to detect one or more phenomenon associated with vehicle 124. For example, and without limitation, sensor 140 may detect a distance traveled by vehicle 124 during a transport.

With continued reference to FIG. 1, sensor 140 may be configured to detect a measurable value of a transport factor and generate corresponding transport data 120. As used in this disclosure, a "sensor" is a device that is configured to detect an input and/or a phenomenon and transmit information related to the detection. In a nonlimiting embodiments, sensor 140 may be communicatively connected to computing device 104. For example, and without limitation, sensor 140 may transduce a detected operation phenomenon and/or characteristic, such as, and without limitation, temperature, voltage, pressure, and the like, into a sensed signal. In one or more embodiments, and without limitation, sensor 140 may include a plurality of sensors. In one or more embodiments, and without limitation, sensor 140 may include one or more temperature sensors, voltmeters, current sensors, hydrometers, infrared sensors, nondispersive infrared (NDIR) sensors, photoelectric sensors, ionization smoke sensors, motion sensors, speed gauges, pressure sensors, radiation sensors, level sensors, imaging devices (e.g., visible light camera or infrared camera), moisture sensors, Ohm sensor, gas and chemical sensors, flame sensors, electrical sensors, force sensors, Hall sensors, any combination thereof, and the like. Sensor 140 may be a contact or a non-contact sensor. For instance, and without limitation, sensor 140 may be connected to vehicle 124 or computing device 104. In other embodiments, sensor 140 may be remote to vehicle 124 or computing device 104. In one or more embodiments, sensor 140 may transmit/receive signals to/from computing device 104. Signals may include electrical, electromagnetic, visual, audio, radio waves, or another undisclosed signal type alone or in combination.

With continued reference to FIG. 1, sensor 140 may include a plurality of independent sensors, where any number of the described sensors may be used to detect any number of physical or electrical quantities associated with a transport, such as a transport factor of a transport. Independent sensors may include separate sensors measuring physical or electrical quantities that may be powered by and/or in communication with circuits independently, where each may signal sensor output to a computing device 104 such as a graphical user interface (GUI). In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 140 to detect phenomenon may be maintained.

Still referring to FIG. 1, sensor 140 may include a motion sensor. A "motion sensor", for the purposes of this disclosure, refers to a device or component configured to detect physical movement of an object or grouping of objects. For example, and without limitation, motion sensor may detect the movement of vehicle 124 or objects being transported by vehicle 124, such as, for example, during an unloading or loading process of transport. One of ordinary skill in the art would appreciate, after reviewing the entirety of this disclosure, that motion may include a plurality of types including, but not limited to: spinning, rotating, oscillating, gyrating, jumping, sliding, reciprocating, displacing, or the like. Sensor 140 may include, torque sensor, gyro meter (e.g., gyroscope), accelerometer, magnetometer, inertial measurement unit (IMU), pressure sensor, force sensor, proximity sensor, displacement sensor, vibration sensor, LIDAR sensor, and the like thereof. In a nonlimiting embodiment, sensor 140 ranges may include a technique for the measuring of distances or slant range from an observer including sensor 140 to a target which may include a plurality of outside parameters. "Outside parameter," for the purposes of this disclosure, refer to environmental factors or physical vehicle factors that may be further captured by sensor 140. Outside parameter may include, but is not limited to, air density, air speed, true airspeed, relative airspeed, current patterns, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of vehicle 124 itself, including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, speed, debris, among others. Environmental parameters may be stored in any suitable datastore consistent with this disclosure. Technique may include the use of active range finding methods which may include, but not limited to, light detection and ranging (LIDAR), radar, sonar, ultrasonic range finding, and the like. LIDAR systems may include, but are not limited to, a laser, at least a phased array, at least a microelectromechanical machine, at least a scanner and/or optic, a photodetector, GPS, and the like. In a non-limiting embodiment, sensor 140 including a LIDAR system may target an object with a laser and measure the time for at least a reflected light to return to the LIDAR system. LIDAR may also be used to make digital 4D representations of areas on the earth's surface and ocean bottom, due to differences in laser return times, and by varying laser wavelengths. In a nonlimiting embodiments, LIDAR system may include a topographic LIDAR and a bathymetric LIDAR, wherein the topographic LIDAR that may use near-infrared laser to map a plot of a land or surface representing a potential checkpoint or travel route of vehicle while the bathymetric LIDAR may use water-penetrating green light to measure seafloor and various water level elevations within and/or surrounding destination or route.

Still referring to FIG. 1, sensor 140 may include a proximity sensor. A "proximity sensor," for the purpose of this disclosure, is a sensor configured to detect the presence of objects. In a nonlimiting embodiment, proximity sensor may include, for example, a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In a non-limiting embodiment, proximity sensor may be configured to detect the presence of an object disposed within vehicle 124.

With continued reference to FIG. 1, in some embodiments, sensor 140 may include a pressure sensor. A "pressure", for the purposes of this disclosure, and as would be appreciated by someone of ordinary skill in the art, is a measure of force required to stop a fluid from expanding and is usually stated in terms of force per unit area. In nonlimiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, a pressure sensor may be configured to transform a pressure into an analogue electrical signal. In some embodiments, pressure sensor may be configured to transform a pressure into a digital signal.

In one or more embodiments, sensor 140 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor.

With continued reference to FIG. 1, in one or more embodiments, sensor 140 may include electrical sensors. Electrical sensors may be configured to measure voltage across a component, electrical current through a component, and resistance of a component. In one or more embodiments, sensor 140 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 140, may be measured in Fahrenheit (° F.), Celsius (° C.), Kelvin (° K.), or another scale alone or in combination. The temperature measured by sensors may comprise electrical signals, which are transmitted to their appropriate destination wireless or through a wired connection. In some embodiments, sensor 140 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like.

With continued reference to FIG. 1, sensor 140 may generate a sensor signal (also referred to in this disclosure as a "signal") related to detections. Signals may include electrical, electromagnetic, visual, audio, radio waves, or another undisclosed signal type alone or in combination. Any data or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 140 may include circuitry, computing devices, electronic components or a combination thereof that translates sensor detections into at least an electronic signal configured to be transmitted to another electronic component, such as computing device 104. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e. quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e. a stochastic process), utilizing statistical properties. For instance, in some embodiments, a signal may be modeled with a probability distribution indicating noise, which then may be used to reduce noise in a processed signal.

Still referring to FIG. 1, in some embodiments, transport data 120 may be provided by a database communicatively connected to computing device 104 or third-party application. In various embodiments, transport data 120 may be inputted into computing device 104 by a user using, such as, for example, a peripheral input device (e.g., keyboard) or an integrate input component (e.g., touchscreen of computing device). For example, and without limitation, a user may input transport data into computing device 104 via a graphical user interface or web application using a keyboard. In other embodiments, transport data 120 may be provided from historical data, such as data collected by sensors or past recorded data related to similar transports (e.g., shipments). For example, and without limitation, one or more sensors communicatively connected to computing device 104 may detect mileage data (e.g., a mileage) of a vehicle and transmit the data to computing device 104 for storage in database. In other embodiments, transport data 120 may be retrieved from a remote database, such as, for example, a website, academic database, government database, or the like.

Still referring to FIG. 1, in one or more embodiments, transport data 120 may be transmitted to a remote device 108. For the purposes of this disclosure, a "remote device" is a device in a different location than apparatus. Remote device 108 may include a user device, such as, for example, a carrier device. Remote device 108 may include a smartphone, mobile phone, laptop computer, desktop computer, tablet, any of computing device and/or system described in this disclosure, and the like.

With continued reference to FIG. 1, memory 112 contains instructions configuring processor 108 to compare transport data 120 to one or more transport plan parameters 128. For the purposes of this disclosure, a "transport plan parameter" is a component or factor of a transport plan. For instance, and without limitation, a transport plan parameter may include a threshold or range for various components of a transport plan. For example, and without limitation, a transport plan parameter may include a delivery time, cost, transport aggregation site operations, and the like. Transport aggregation site operation may include fully operational, semi-operation, non-operation, overcrowded, empty, and the like. A "transport plan", for the purposes of this disclosure, is a compilation of transport plan parameters for conducting and completing a transport. For example, and without limitation, transport plan may include one or more routes, pathways, estimated arrival times, dates, transport component volumes or sizes, and the like. A transport plan may include a handoff, such as objects of a transport being transferred from a first transport vehicle that conducted a first component of a transport plan to a second transport vehicle that will conduct a second component of a transport, may include carbon emission metric may include greenhouse gas data, as discussed further below.

Still referring to FIG. 1, apparatus 100 may receive transport plan parameters or transport plan via user input. "User input" as used in this disclosure is a form of data entry received from an individual and/or group of individuals. User input 104 may include, but is not limited to, text input, engagement with icons of a graphical user interface (GUI), and the like. Text input may include, without limitation, entry of characters, words, strings, symbols, and the like. In some embodiments, user input may include one or more interactions with one or more elements of a graphical user interface (GUI), such as GUI. A "graphical user interface" as used in this disclosure is an interface including set of one or more pictorial and/or graphical icons corresponding to one or more computer actions. GUI may be configured to receive user input. GUI may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance, and without limitation, an event handler may be programmed to generate a pop-up window if a user double clicks on a specific icon. User input may include, a manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input may include touch input. Touch input may include, but is not limited to, single taps, double taps, triple taps, long presses, swiping gestures, and the like. In some embodiments, GUI may be displayed on, without limitation, monitors, smartphones, tablets, vehicle displays, and the like. Vehicle displays may include, without limitation, monitors and/or systems in a vehicle such as multimedia centers, digital cockpits, entertainment systems, and the like. One of ordinary skill in the art upon reading this disclosure will appreciate the various ways a user may interact with graphical user interface.

Still referring to FIG. 1, in some embodiments, comparing transport data 120 to one or more transport plan parameters 128 may include generating an objective function. In one or more embodiments, apparatus 100 may include an objective function to compare transport data 120 to one or more transport plan parameters, which may include a threshold or range. An "objective function" as used in this disclosure is a process of minimizing or maximizing one or more values based on a set of constraints. Computing device 104 may generate an objective function to optimize one or more pathways of a transport of, for example, a carrier. In one or more embodiments, transport plan parameter may include a plan threshold 132. For the purposes of this disclosure, a "plan threshold" is any description of a desired value or range of values for one or more components of a transport plan. Desired value or range of values may include a maximal or minimal value, a range between maximal or minimal values, or an instruction to maximize or minimize an attribute and/or a threshold value. As a nonlimiting example, plan threshold 132 may specify that a transport must arrive by a specific time. Plan threshold 132 may cap a carbon emission of a transport, for instance, specifying that a transport must not have a carbon emission greater than a specified value. Plan threshold 132 may specify one or more desired transport factors. In an embodiment, plan threshold 132 may assign weights to different components or values associated with components. Weights, as used in this disclosure, may be multipliers or other scalar numbers reflecting a relative importance of a particular component or value.

One or more weights may be expressions of value to a user of a particular outcome, component value, or other facet of a transport. Value may be expressed, as a nonlimiting example, in remunerative form, such as a material quality, a quickest transport, or the like. As a nonlimiting example, minimization of a transport duration may be multiplied by a first weight, while tolerance above a certain value may be multiplied by a second weight. Plan threshold 132 may be combined in weighted or unweighted combinations into a function reflecting an overall outcome desired by a user. A function may be a transport parameter function to be minimized and/or maximized. A function may be defined by reference to transport parameter constraints and/or weighted aggregation thereof as provided by apparatus 100. For instance, and without limitation, a transport parameter function combining optimization criteria may seek to minimize or maximize a function of transport aggregation site operations.

Still referring to FIG. 1, memory 112 contains instructions configuring processor 108 to generate a pathway deviation 136 as a function of the comparison of transport data 120 of current transport and transport plan parameters 128 of transport plan. For the purposes of this disclosure, a "pathway deviation" is instructions for modifying a current transport to an updated transport, where one or more factors of the transport may be altered to achieve the updated transport. Pathway deviation 136 may include instructions for updated transport. For the purposes of this disclosure, "updated transport" is an optimization of current transport so that transport plan parameters of transport plan may be accomplished. Pathway deviation 136 may include an updated route, path, transport component, handoff, or other updated factor that allows for transport plan parameter to be substantially met. For instance, and without limitation, transport data 120 may include a current route that a transport vehicle is traveling along, such as, for example, a particular road that a truck is traversing along, and a corresponding current arrival time of transport; transport plan parameter 128 may include an expected arrival time of transport vehicle. A "current route", for the purposes of this disclosure, is a real-time path of a transport. Current arrival time along the current route is compared to the expected arrival time. A value of current arrival time may vary from expected arrival time by an amount exceeding plan threshold 132, and thus, a pathway deviation may be generated by processor. Pathway deviation 136 instruct an operator of transport vehicle to alter current route to updated route of pathway deviation. Updating transport allows for expected arrival time to be achieved by transport vehicle. In one or more embodiments, pathway deviation 136 may be visually represented on display 116 of computing device 104. In some embodiments, computing device 104 may display information through a graphical user interface (GUI). In some embodiments, computing device 104 may be configured to display information to a user through, but not limited to, a smartphone, tablet, desktop, laptop, head-up display (HUD), vehicle dashboard interface, and the like. Computing device 104 may display alternative options for a transport of a user. In another instance, and without limitation, a transport vehicle may experience extensive traffic along a particular route during current transport, causing an extra hour to be added to a current arrival time of the transport. Pathway deviation 136 may then provide instructions to the operator of the transport vehicle to take an updated route that has less traffic, which will allow updated transport to arrive at the originally expected arrival time. In another case, pathway deviation 136 may instruct a handoff to a second transport vehicle, such as an aircraft, to avoid the traffic of the current route, where the second vehicle may take a second route that does not have traffic and will allow transport to arrive at the expected arrival time (e.g., transport plan parameter). Pathway deviation 136 may include steps and/or instructions to optimize transport, such one or more pathways of transport, so that one or more parameters of a transport plan of transport may be achieved.

Still referring to FIG. 1, an objective function may be formulated as a linear objective function. Processor 108 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transports r, S is a set of all transport plan parameters s, $c_{rs}$ is a score of a pairing of a given transport with a given transport plan parameter, and $x_{rs}$ is 1 if a transport r is paired with a transport plan parameter s, and 0 otherwise. Continuing the example, constraints may specify that each transport is assigned to only one transport plan parameters, and each transport plan parameter is assigned only one transport. Matches may include matching processes as described above. Sets of processes may be optimized for a maximum score combination of all generated processes. In various embodiments, processor 108 may determine a combination of transports that maximizes a total score subject to a constraint that all transport data is paired to exactly transport plan parameter. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100 and/or another device, such as computing device 104, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, processor 108 may assign variables relating to a set of parameters, which may correspond to score components as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of transport times. Objectives may include minimization of travel distance. Objectives may include minimization of handoff times. Objectives may include minimization of resources used, such as, for example, fuel usage.

In one or more embodiments, other contributing transport factors of transport data, may include, but are not limited to, traffic, weather conditions, amounts of stops (e.g., handoffs, inspections, or maintenance) in a transport, transport weight, transport path efficiency, and the like. Processor 108 may compare two or more transport factors using an objective function to minimize an amount of travel time, reduce transport costs, accommodate transport aggregation site operations engagements, reduce refueling, increase carrying capacity, and the like. Such as, for example, greenhouse gases produced by transport. As a nonlimiting example, and without limitation, processor 108 may compare current transport distance to a number of expected stops in a transport route. Processor 108 may determine that necessary stops may be achieved within an optimal amount of time (e.g., completion of transport by an expected arrival time of a transport plan) by altering current path to an updated path.

Still referring to FIG. 1, processor 108 may utilize an optimization machine-learning model to generate pathway deviation 136. For instance, and without limitation, optimization machine-learning module 144 may be trained on training data correlating transport data to corresponding transport plan parameters to generate an optimization machine-learning model, which may receive inputs of transport data 120 and transport plan parameters 128 and provide outputs of pathway deviations 136. For example, and without limitation, optimization machine-learning model may be configured to input transport factors and output updated paths. In one or more embodiments, an optimization machine-learning module 144 may be used to generate optimization machine-learning model using one or more training data sets, as described further in FIG. 4. Optimization machine-learning model may include an algorithm that will be performed by processor 104. In one or more embodiments, training data may include information containing correlations that optimization machine-learning module 144 may use to model relationships between two or more categories of data elements. For instance, and without limitation, training data may include a plurality of data entries, each entry representing a set of data elements that were recorded, received, and/or generated together. For example, and without limitation, training data may include plan parameters inputs and training data inputs which are correlated to pathway deviation outputs. Once optimization machine-learning module has created optimization machine-learning model, then optimization machine-learning model may receive transport data 120 and plan parameters 128 to generate corresponding pathway deviation 136.

Figure 2:
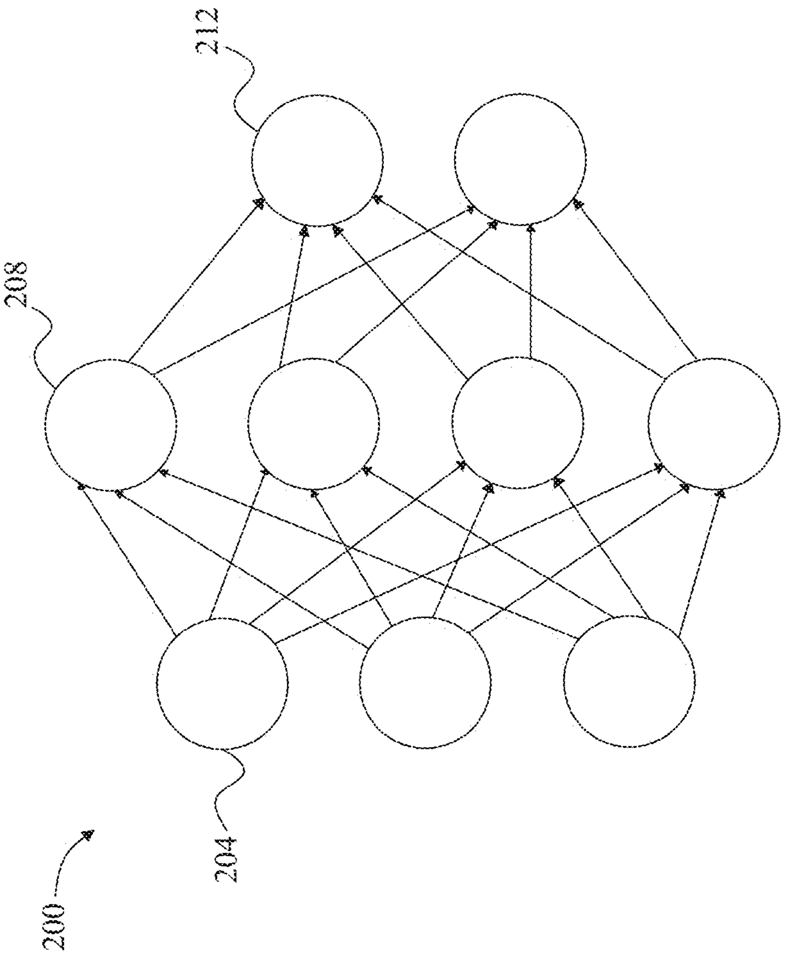
FIG. 2 is a diagram of an exemplary embodiment of a neural network in accordance with one or more embodiments of the present disclosure.

Referring now to FIG. 2, an exemplary embodiment of neural network 200 is illustrated. A neural network 200 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 204, one or more intermediate layers 208, and an output layer of nodes 212. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further nonlimiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 3:
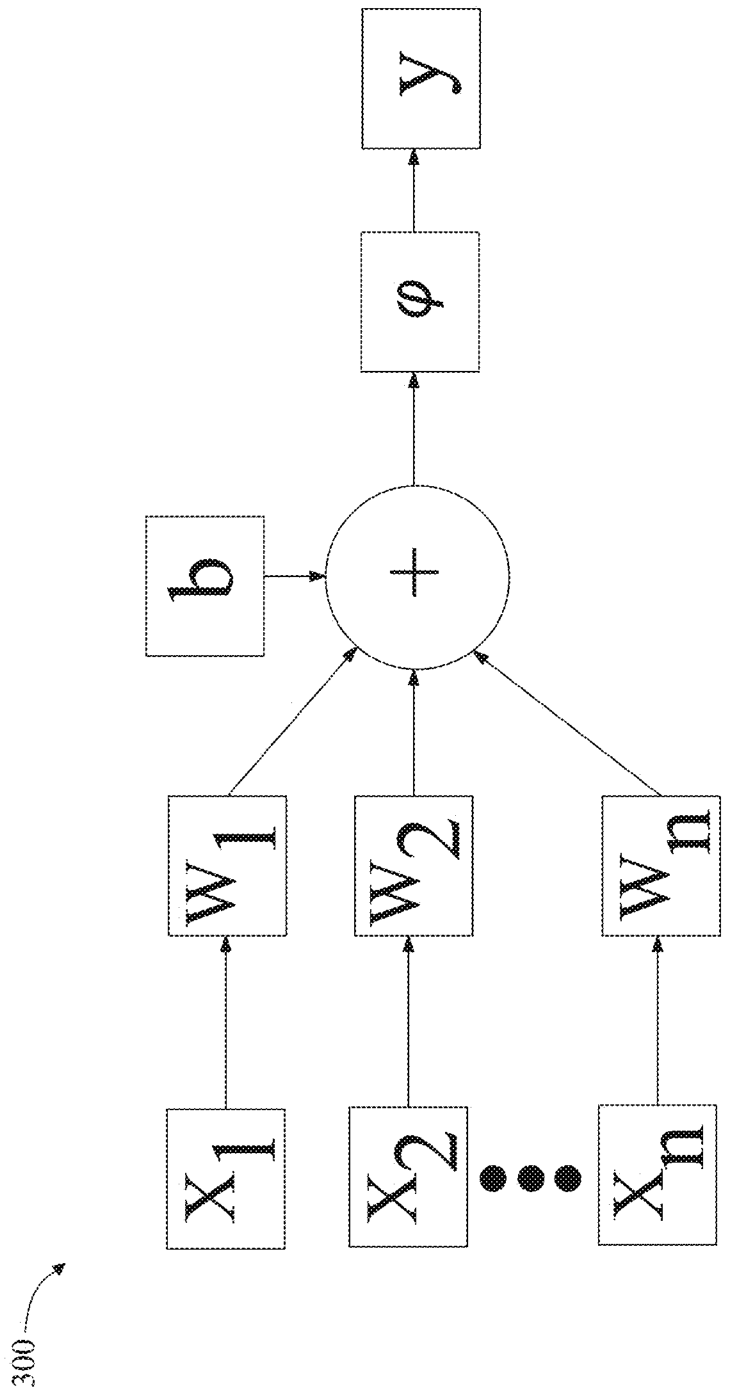
FIG. 3 is a diagram of an exemplary embodiment of a node of a neural network in accordance with one or more embodiments of the present disclosure.

Referring now to FIG. 3, an exemplary embodiment of a node of a neural network 300 is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 4:
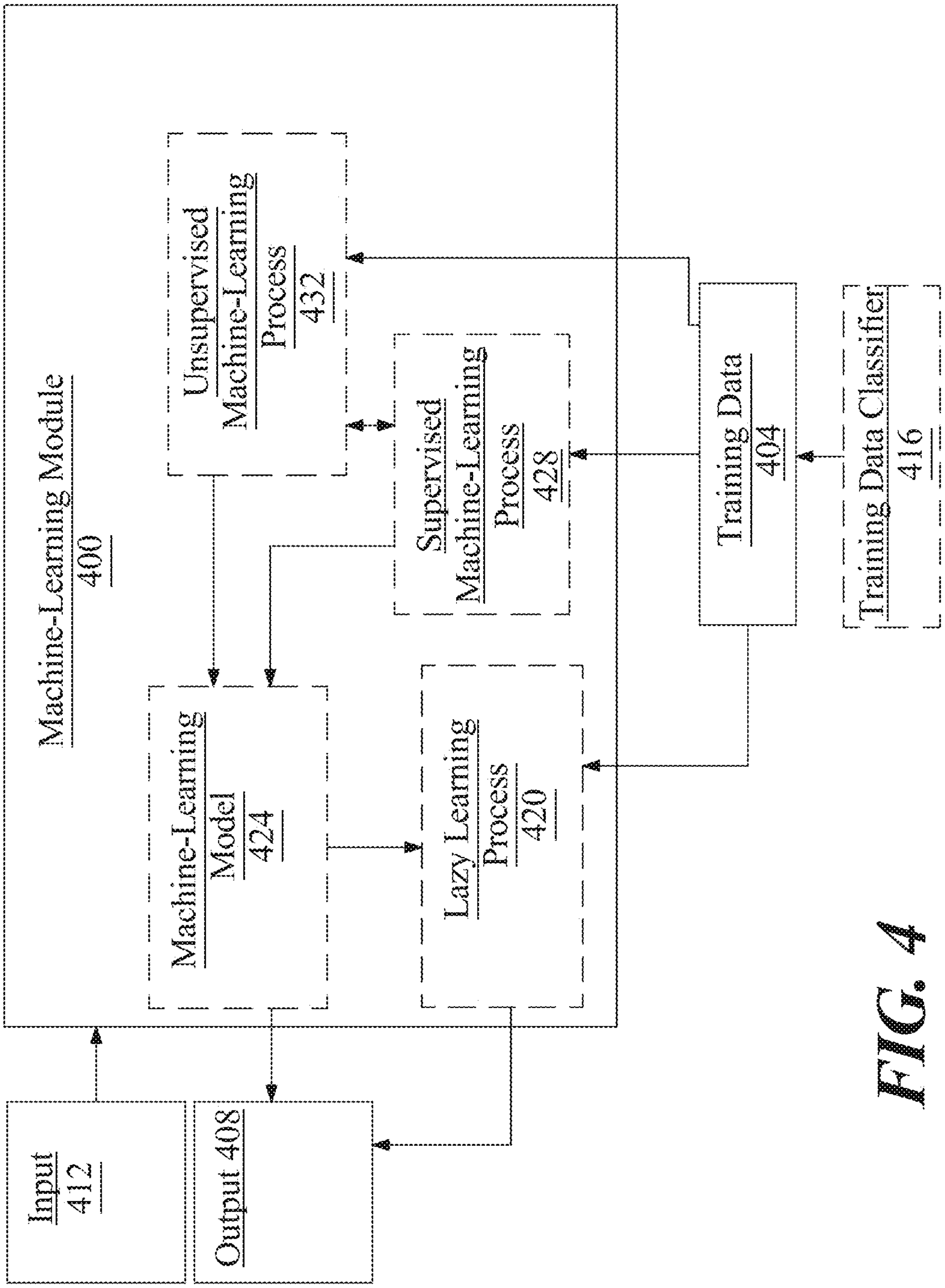
FIG. 4 is a block diagram of an exemplary embodiment of a machine-learning module in accordance with one or more embodiments of the present disclosure.

Now referring to FIG. 4, an exemplary embodiment of a machine-learning module 400 that may perform one or more machine-learning processes as described in this disclosure is illustrated. Machine-module may be in reference to any machine-learning modules described in this disclosure. For example, and without limitation, machine-learning module 400 may include optimization machine learning module. Machine-learning module 400 may perform determinations, classification, and/or analysis steps, methods, processes, or the like as described in this disclosure using machine learning processes. A "machine-learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
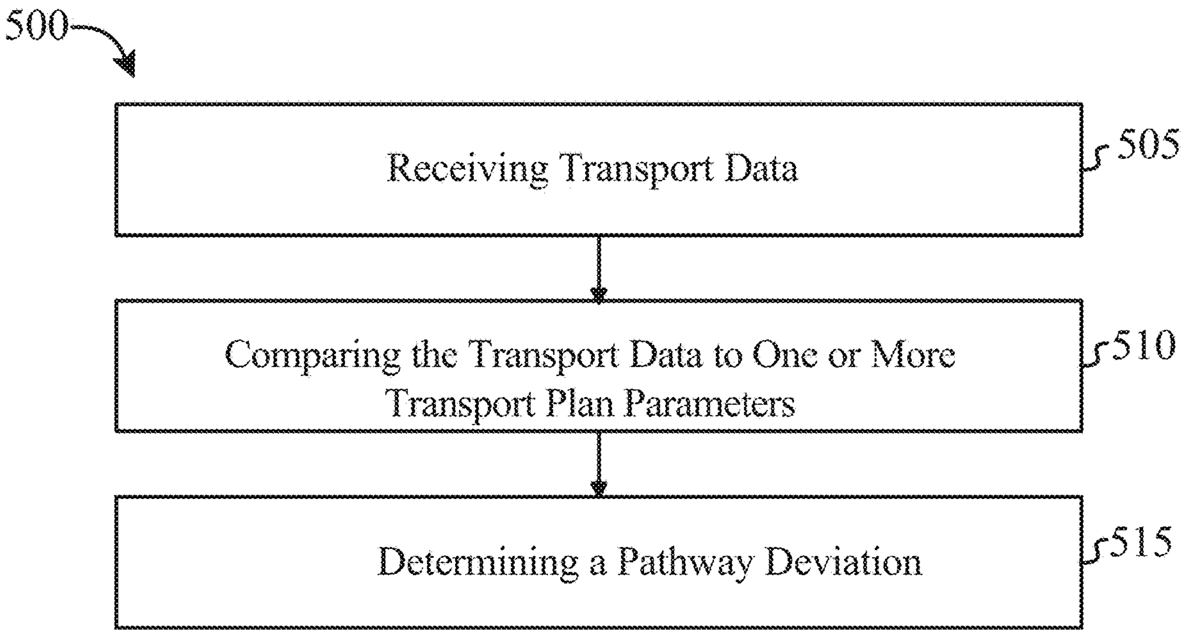
FIG. 5 is a flow chart of an exemplary embodiment of a method for transport optimization in accordance with one or more embodiments of the present disclosure.

Now referring to FIG. 5, a flow chart of an exemplary method 500 of optimizing a transport is shown. As shown in step 505, method 500 may include receiving, by processor 108, transport data 120. This may be implemented as disclosed with reference to FIGS. 1-4. Transport data 120 may be received from a remote computing device. Transport data 120 may be received from a sensor, such as any sensor previously discussed in this disclosure. Transport data 120 may include factors such as vehicle type, weather conditions, road types, path types, traffic conditions of a current route, estimated transport times, such as estimated times or arrivals, estimated departure times, estimated total transport duration, and the like. Transport data may include any transport data described in this disclosure.

Still referring to FIG. 5, as shown in step 510, method 500 may include comparing one or more transport plan parameters 128 of transport plan of transport to transport data 120. This may be implemented as disclosed with reference to FIGS. 1-4. For example, and without limitation, transport plan parameter 128 may include expected arrival times, dates, transport volumes (e.g., quantity of objects carried by a transport vehicle), required handoffs, required inspections, necessary maintenance, refueling stops, and the like. Transport plan parameters may include any transport plan parameters described in this disclosure. In one or more embodiments, comparing transport plan parameter and transport data may include determining if transport data 128 exceeds a preconfigured threshold, such a plan threshold 132.

Still referring to FIG. 5, as shown in step 515, method 500 may include determining pathway deviation 136 as a function of the comparison between transport data 120 and transport plan parameters 128. This may be implemented as disclosed with reference to FIGS. 1-4. In one or more embodiments, pathway deviation may include an updated path for transport vehicle to traverse along. In other embodiments, pathway deviation, may include a route having less traffic than the current route traveled by transport vehicle. In one or more embodiments, pathway deviation may be displayed display 116 of computing device 104. In one or more embodiments, pathway deviation 136 includes instructions for an operator to follow in order to alter current route to updated route. Pathway deviation 136 may include recommendations or instructions to alter a current path to an updated path to achieve a set transport plan parameter of a transport plan. For example, and without limitation, pathway deviation may recommend a handoff where a second transport vehicle received the objects form the first transport vehicle, and the second transport vehicle transport along an updated path to achieved an expected duration of transport. In another example, and without limitation, pathway deviation 136 may recommend a first route instead of other routes to a destination of a transport based on the first route including, for example, a desirable distance (e.g., a shorter distance than other routes), desirable topography (e.g., less inclines or high-gradient roads), favorable traffic conditions (e.g., minimum traffic), desirable weather conditions (e.g., no black ice), and the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
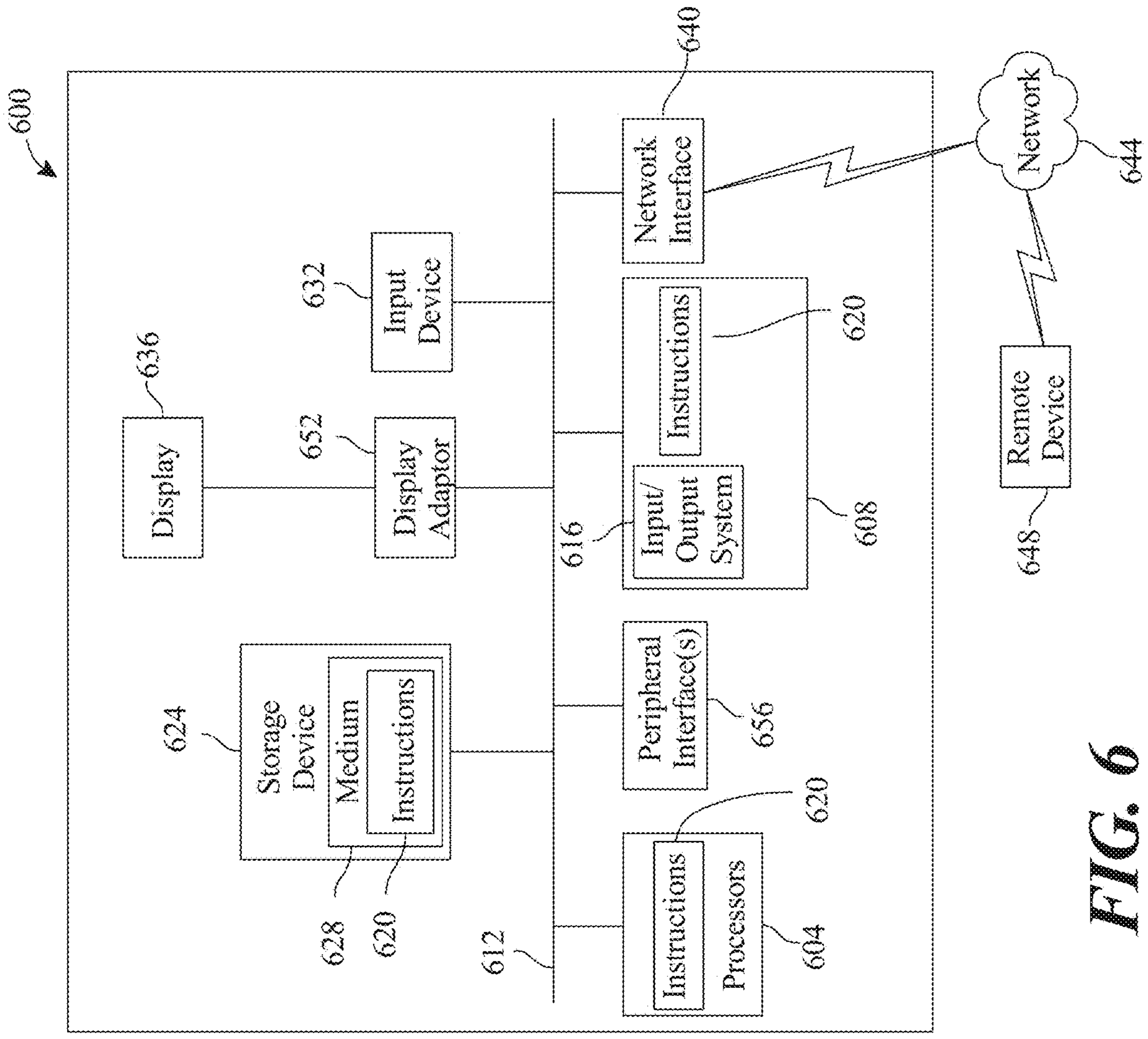
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera, a visible light camera, and infrared camera, and the like), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for transport optimization, the apparatus comprising:

at least a processor; and a memory communicatively connected to the at least a processor, the memory comprising instructions configuring the at least a processor to:

receive transport data related to a transport, the transport data comprising vehicle data comprising fuel usage data and cargo data for the transport, the cargo data comprising information related to an unloading or loading of objects onto a vehicle, dimensions, a weight, and a quantity of the transport, wherein the cargo data further comprises data related to one or more of a fragility measurement, perishability status, or temperature requirement, wherein the transport data further comprises a gradient of a surface the vehicle travels along during the transport, wherein receiving the transport data further comprises calculating a carbon emission metric using an emission machine-learning model as function of the transport data related to the unloading or loading of objects onto the vehicle;

compare the transport data to one or more transport plan parameters of a current transport plan of the transport, wherein the one or more transport plan parameters comprises a transport component size, and wherein the one or more transport plan parameters comprises a plan threshold providing a range of acceptable values of the transport data and the fuel usage data, wherein the plan threshold:

assigns a weight to each of the one or more transport plan parameters, each weight reflecting a relative importance of each transport plan parameter;

determines a combination of the transport data that maximizes a score of an objective function based on a constraint assigned to a pair of the transport data and the one or more transport plan parameters; and caps a carbon emission of the transport by a predetermined value; and determine, using an optimization machine-learning model, a pathway deviation as a function of at least the dimensions of the transport data and at least the transport component size of the one or more transport plan parameters, wherein the pathway deviation comprises a handoff of at least a portion of the transport from a first vehicle to a second vehicle, and wherein the at least a processor is configured to instruct an operator of the second vehicle to update the current transport plan based on the pathway deviation, wherein determining the pathway deviation comprises:

receiving a training data set, wherein the training data set comprises outputs correlated with inputs, wherein the inputs comprise a plurality of transport data inputs and transport plan parameter inputs, and the outputs comprise a plurality of pathway deviations;

filtering the training data set using a training data classifier, wherein the training data classifier identifies one or more subsets of the training data and labels the one or more subsets based on a distance metric; and generating the optimization machine-learning model as a function of the filtered training data set, wherein the optimization machine-learning model determines the pathway deviation as a function of the transport data and the one or more transport plan parameters.

2. The apparatus of claim 1, wherein the memory contains instructions further configuring the at least a processor to identify the one or more transport plan parameters of the current transport plan as a function of a user input.

3. The apparatus of claim 1, wherein the transport data comprises a traffic condition.

4. The apparatus of claim 1, wherein the transport data comprises a current route.

5. The apparatus of claim 1, further comprising a sensor communicatively connected to the at least a processor, wherein the sensor is configured to detect a factor of the transport and transmit the transport data as a function of the detected factor.

6. The apparatus of claim 5, wherein the sensor comprises a global positioning system (GPS).

7. The apparatus of claim 1, wherein determining the pathway deviation comprises comparing the transport data to the plan threshold of the one or more transport plan parameters.

8. The apparatus of claim 1, wherein the memory contains instructions configuring the at least a processor to create a second objective function, wherein the second objective function is configured to generate a pathway as a function of the transport data and the one or more transport plan parameters.

9. The apparatus of claim 1, further comprising a motion sensor communicatively connected to the at least a processor and configured to generate the transport data, wherein the transport data comprises a physical movement of the vehicle associated with the transport.

10. The apparatus of claim 1, wherein the optimization machine-learning model comprises a supervised machine-learning model.

11. A method for transport optimization, the method comprising:

receiving, by a processor, transport data related to a transport, the transport data comprising vehicle data comprising fuel usage data and cargo data for the transport, the cargo data comprising information related to an unloading or loading of objects onto a vehicle, dimensions, a weight, and a quantity of the transport, wherein the cargo data further comprises data related to one or more of a fragility measurement, perishability status, or temperature requirement, wherein the transport data further comprises a gradient of a surface the vehicle travels along during the transport, wherein receiving the transport data further comprises calculating a carbon emission metric using an emission machine-learning model as function of the transport data related to the unloading or loading of objects onto the vehicle;

comparing, by the processor, the transport data to one or more transport plan parameters of a transport plan of the transport, transport, wherein the one or more transport plan parameters comprises a transport component size, and wherein the one or more transport plan parameters comprises a plan threshold providing a range of acceptable values of the transport data and the fuel usage data, wherein the plan threshold:

assigns a weight to each of the one or more transport plan parameters, wherein each weight reflects a relative importance of each transport plan parameter;

determines a combination of the transport data that maximizes a score of an objective function based on a constraint assigned to a pair of the transport data and the one or more transport plan parameters; and caps a carbon emission of the transport by a predetermined value; and determining, using an optimization machine-learning model, a pathway deviation as a function of at least the dimensions of the transport data and at least the transport component size of the one or more transport plan parameters, wherein the pathway deviation comprises a handoff of at least a portion of the transport from a first vehicle to a second vehicle, and wherein the processor is configured to instruct an operator of the second vehicle to update a current transport plan based on the pathway deviation, wherein determining the pathway deviation comprises:

receiving a training data set, wherein the training data set comprises outputs correlated with inputs, wherein the inputs comprise a plurality of transport data inputs and transport plan parameter inputs, and the outputs comprise a plurality of pathway deviations;

filtering the training data set using a training data classifier, wherein the training data classifier identifies one or more subsets of the training data and labels the one or more subsets based on a distance metric; and generating the optimization machine-learning model as a function of the filtered training data set, wherein the optimization machine-learning model determines the pathway deviation as a function of the transport data and the one or more transport plan parameters.

12. The method of claim 11, further comprising identifying, by the processor, the one or more transport plan parameters of the current transport plan as a function of a user input.

13. The method of claim 11, wherein the transport data comprises a traffic condition.

14. The method of claim 11, wherein the transport data comprises a current route.

15. The method of claim 11, further comprising detecting, by a sensor communicatively connected to the processor, a factor of the transport and transmitting the transport data as a function of the detected factor of the transport.

16. The method of claim 15, wherein the sensor comprises a global positioning system (GPS).

17. The method of claim 11, wherein determining the pathway deviation comprises comparing the transport data to the plan threshold of the one or more transport plan parameters.

18. The method of claim 11, further comprising creating, by the processor, a second objective function, wherein the second objective function is configured to generate a pathway as a function of the transport data and the one or more transport plan parameters.

19. The method of claim 11, further comprising generating, by a motion sensor communicatively connected to the processor, the transport data, wherein the transport data comprises a physical movement of the vehicle associated with the transport.

20. The method of claim 11, wherein the optimization machine-learning model comprises a supervised machine-learning model.

* * * * *